Patented Jan. 7, 1936

2,027,031

UNITED STATES PATENT OFFICE 2,027,031

OXAZOLINE COMPOUND

Max Engelmann, Wilmington, Del., assignor to E. I. du Pont de Nemours & Company, Wilmington, Del., a corporation of Delaware No Drawing. Application August 19, 1932, Serial No. 629,493

11 Claims. (Cl. 260—44)

This invention relates to carbon compounds, specifically dihydro-oxazoles (also called oxazolines) and more particularly to substituted phenyl-imino-dihydro-oxazoles.

It has been discovered that when substituted phenyl-isocyanates are reacted with halogen-ethyl-amines reactions leading to the formation of substituted phenyl-imino-dihydro-oxazoles take place. So far as now appears an N-phenyl-N'-alkyl-halogen-urea is formed as a result of the reaction between the substituted phenyl-isocyanate and the halogen-ethyl-amine. This urea upon further treatment, for example by heating in water or an inert solvent, is converted into a substituted phenyl-imino-dihydro-oxazole seemingly by the splitting off of one mole of a hydrohalide.

This invention has for an object the preparation of new carbon compounds. Other objects are the preparation of substituted aryl-amino-dihydro-oxazoles, the preparation of substituted aryl-amino-dihydro-oxazoles from aryl-isocyanates and the preparation of substituted aryl-imino-dihydro-oxazoles from substituted aryl-alkyl-halogen-ureas. Still further objects are the preparation of the aforementioned compounds in a very desirable physical state and in a high degree of purity, their preparation by novel and/or economical chemical processes and their preparation by methods which are easily controlled and readily carried out. A general advance in the art and other objects which will appear hereinafter, are also contemplated.

Generally speaking, the objects of this invention are accomplished by reacting substituted-phenyl-isocyanates with halogen-ethyl-amines and further treating the resultant product or substituted-phenyl-alkyl-halogen-ureas to produce substituted-phenyl-dihydro-oxazoles. The reactions taking place are probably indicated by the following equation:

(R=an aryl radical; X=halogen)

The invention will be further understood from a consideration of the following detailed description and the specific examples in which the parts are given by weight.

Example I

Forty-one (41) parts of bromo-ethyl-amine-hydrobromide were suspended in 120 parts of benzene. To this suspension 50 parts of a 50% potassium hydroxide solution, previously cooled to about 5° C., were added and the whole mixture agitated for a few minutes in a separatory funnel. The water solution containing the resultant potassium bromide and the excess of potassium hydroxide was removed from the benzene containing the free bromo-ethyl-amine. Thereafter the benzene solution was dried with a small piece of potassium hydroxide and 30 parts of para-ethoxy-phenyl-isocyanate were added. Some heat was generated and a crystalline product separated from the solution. This product, N-para-ethoxy-phenyl-N'-bromo-ethyl-urea was filtered off and dried. After recrystallization from ethyl alcohol it was found to have a melting point of 135° C. This urea (about 45 parts) was heated for 15 minutes with water to boiling. It went into solution with the formation of the hydrobromide salt of 2-para-ethoxy-phenyl-imino-dihydro-oxazole. The solution was cooled down and neutralized with ammonia water. The free base formed by this treatment was filtered off and recrystallized from ethyl alcohol. It had a melting point of 151° C. It is soluble in alcohol, benzene and acetone. It is practically insoluble in water. With acids it forms water soluble salts. The melting point of the hydrochloric acid salt was found to be 147° C.

The product has most probably the following formula:

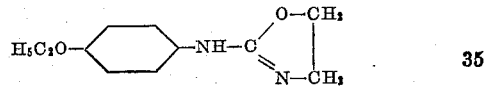

Example II

Twenty-five (25) parts of para-normal-butyl-oxy-phenyl-bromo-ethyl-urea, having a melting point of 121° C., (obtained in a manner similar to that described in Example I, using normal-butyloxy-phenyl-isocyanate) was boiled with 100 parts of water in a reflux condenser. The urea derivative, during the process of boiling, went into solution with the formation of the hydrobromic salt of para-normal-butyloxy-phenyl-imino-dihydro-oxazole. The resultant solution was neutralized with ammonia water and the free base filtered off. It was recrystallized from ethyl alcohol and found to melt at 130° C. It is practically insoluble in water. It was found to be soluble in alcohol, benzene, acetone and acids. It forms water soluble salts, for example, the hydrochloric salt which has a melting point of 117° C. The product formed according to the above procedure probably has the following chemical formula:

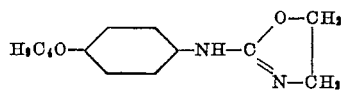

Chloro-ethyl-amine and the like may also be used as starting materials.

Compounds in which the hydrogen atoms of the ethyl group of the substituted-aryl-halo-ethyl-urea are replaced by organic radicals, for instance alkyl or aryl radicals, are readily prepared by the processes above set out as indicated by the following equation in which one of the aforesaid hydrogen atoms is shown to have been replaced by a methyl radical:

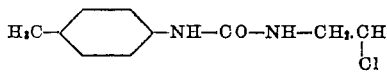

The processes above described are applicable to substituted aryl-imino-dihydro-oxazoles in general. Of particular interest, however, because of their practical value as local anesthetics, are compounds of the general formula

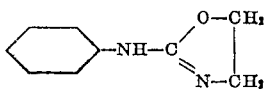

wherein the phenyl nucleus is substituted by at least one non-acidic substituent, such as halogen, alkyl, alkoxy, and thioalkyl.

Substituent radicals which produce especially desirable results include methyl, ethyl, propyl, isopropyl, butyl, isobutyl, amyl, isoamyl, hexyl, cyclohexyl, heptyl, allyl, benzyl, vinyl, methoxy, ethoxy, propoxy, isopropoxy, butyloxy, isobutyloxy, amyloxy, phenyl, naphthyl, chlorine, bromine phenyloxy, naphthyloxy, methyl-thiohydroxyl, ethyl-thiohydroxyl, isopropyl-thiohydroxyl and amyl-thiohydroxyl. It will be noted that these substituents do not neutralize the basicity of the compound and do not deprive it of its capacity to form a salt with HCl.

The invention is not limited to the use of benzene as a suspension agent. Where desired such compounds as ethylene dichloride, chlorobenzenes, carbon tetrachloride, nitrobenzene and nitro-toluene may be used. Where desired the elimination of the suspension agent may be accomplished by adding the isocyanate directly to an excess of the halogen ethyl amine.

In the formation of the dihydro-oxazole from the halogen urea, the invention is not limited to water as a suspension agent or solvent. Such inert solvents as aliphatic alcohols, particularly ethyl alcohol, for use in this step, merit special mention.

The compounds produced according to this invention readily form acid salts. For example, the hydrohalide salts, particularly the hydrochloride and the hydrobromide, the oxalate, the formate, the nitrate, the chloracetate, the disulphate (oxazoline 2·H₂SO₄) the picrate and the diphosphate (oxazoline 2·H₃PO₄).

It may be that in some instances the compounds produced according to this invention exist in a tautomeric form, the possibility of which is indicated by the following formulae:

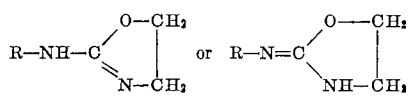

The products of the processes previously described are regarded as a part of this invention regardless of the tautomeric form in which they actually exist and whenever formulae or names are used in this application it is intended that the said compounds be covered regardless of their tautomeric form.

These products are stable bodies of basic character and have valuable local anesthetic properties.

As many apparently widely different embodiments of this invention may be made without departing from the spirit and scope thereof, it is to be understood that I do not limit myself to the specific embodiments thereof except as defined in the appended claims.

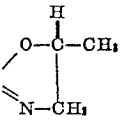

I claim:

1. A 2-arylimino-dihydro-oxazole, wherein the aryl radical is of the benzene series.

2. A 2-phenylimino-dihydro-oxazole, wherein the phenyl radical is substituted by at least one substituent which does not neutralize the basicity of the compound or deprive it of its capacity to form a salt with HCl.

3. A compound of the general formula

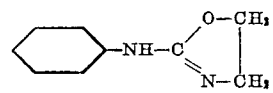

wherein the phenyl nucleus is substituted by at least one substituent of the group consisting of halogen, alkyl, alkoxy and thioalkyl.

4. A process for preparing a 2-phenylimino-dihydro-oxazole, which comprises reacting a phenyl-isocyanate with a β-halogen-ethylamine to produce a phenyl-(β-halogen-ethyl)-urea, heating the latter in an inert solvent to produce the hydrohalide of the desired oxazole compound, and neutralizing the solution with alkali to precipitate a phenylimino-dihydro-oxazole.

5. A process of preparing a 2-phenylimino-dihydro-oxazole in which the phenyl nucleus contains at least one substituent which does not neutralize the basicity of the compound or deprive it of its capacity to form a salt with HCl, which comprises reacting a correspondingly substituted phenyl-isocyanate with a β-halogen-ethylamine to produce the corresponding phenyl-(β-halogen-ethyl)-urea, heating the latter in a solvent selected from the group consisting of water and aliphatic alcohols, and neutralizing the solution thus formed to precipitate the oxazole compound in basic form.

6. The process of producing a 2-para-alkoxy-phenylimino-dihydro-oxazole, which comprises heating N-para-alkoxy-phenyl-N'-β-halogen-ethyl-urea in water until substantially dissolved, and adding ammonia to precipitate the oxazole in the form of free base.

7. 2-para-alkoxy-phenyl-dihydro-oxazole.

8. 2-para-ethoxy-phenyl-dihydro-oxazole.

9. 2-para-n-butyloxy-phenyl-dihydro-oxazole.

10. A process for preparing a 2-arylimino-dihydro-oxazole of the benzene series, which comprises reacting an aryl-isocyanate of the benzene series with a β-halogen-ethylamine to produce the corresponding N-aryl-N'-β-halogen-ethyl-urea, and heating the latter in an inert solvent to produce the corresponding oxazole compound.

11. In the process of producing an oxazole compound, the step which comprises reacting a β-halogen-ethylamine in an inert organic liquid with a phenylisocyanate in which the phenyl nucleus is substituted by a substituent which does not neutralize the basicity of the compound or deprive it of its capacity to form a salt with HCl, to produce the corresponding N-phenyl-N'-halogen-ethyl-urea.

MAX ENGELMANN.